United States Patent [19]

Takayanagi et al.

[11] Patent Number: 4,983,429
[45] Date of Patent: Jan. 8, 1991

[54] PROCESS FOR PRODUCING CELLS FOR LIQUID CRYSTAL DISPLAY DEVICES

[75] Inventors: Takashi Takayanagi; Hideo Kawaguchi, both of Shizuoka, Japan

[73] Assignee: Fuji Photo Film Co., Ltd., Kanagawa, Japan

[21] Appl. No.: 445,156

[22] Filed: Dec. 6, 1989

Related U.S. Application Data

[63] Continuation of Ser. No. 218,003, Jul. 13, 1988, abandoned.

[30] Foreign Application Priority Data

Jul. 13, 1987 [JP] Japan ................................ 62-174501

[51] Int. Cl.$^5$ ............................................. C09K 19/00
[52] U.S. Cl. .................................. 428/001; 156/275.7; 156/277; 156/292; 156/330; 350/344; 428/215
[58] Field of Search ................................ 118/256, 401; 427/208.6; 350/340, 341, 344; 156/272.2, 272.4, 275.7, 292, 299, 277, 330; 428/1, 215

[56] References Cited

U.S. PATENT DOCUMENTS

| | | | |
|---|---|---|---|
| 4,222,635 | 9/1980 | Julke | 350/344 X |
| 4,458,987 | 7/1984 | Sasaki et al. | 350/344 X |
| 4,485,387 | 11/1984 | Drumheller | 118/401 |
| 4,685,770 | 8/1987 | Baeger | 350/344 |
| 4,740,060 | 4/1988 | Komura et al. | 350/344 |
| 4,775,225 | 10/1988 | Tsuboyama et al. | 350/344 |
| 4,776,675 | 10/1988 | Takaochi et al. | 350/339 F |

FOREIGN PATENT DOCUMENTS

| | | | |
|---|---|---|---|
| 0226697 | 7/1987 | European Pat. Off. | 350/344 |
| 2102977 | 2/1983 | United Kingdom | 350/344 |

*Primary Examiner*—Robert A. Dawson
*Attorney, Agent, or Firm*—Sughrue, Mion, Zinn, Macpeak & Seas

[57] ABSTRACT

A process for producing a cell for liquid crystal display device is disclosed which comprises the steps of providing an adhesive which contains spherical or rod-like spacers on at least one of display areas of two transparent substrates having provided on each of the surfaces thereof a transparent electrode and an alignment layer, in a dot-like or stripe-like pattern by letterpress printing, and bonding the substrate thus printed to another transparent substrate facing each other.

3 Claims, 2 Drawing Sheets

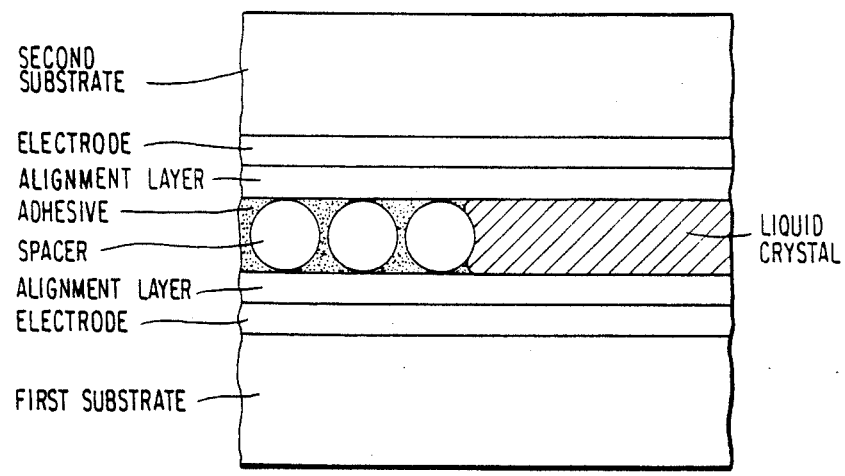
FIG. 1
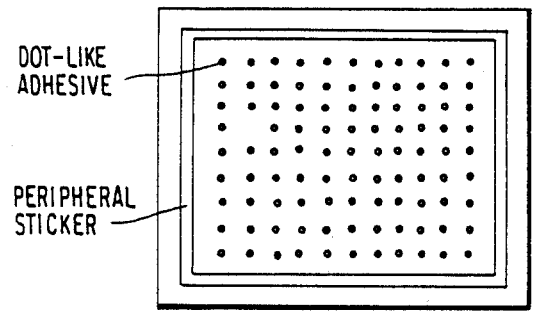
FIG. 2(a)
FIG. 2(b)
PARTIAL ENLARGEMENT
OF DOT-LIKE ADHESIVE
(TRANSVERSE CROSS-
SECTION)
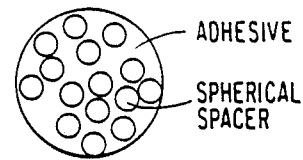

CONVEX SECTION IN A TRAPEZOID FORM

TRAPEZOID WITH CONCAVE TOP

CONCAVE

TRIANGLE FORM

SPECIAL FORM

PROCESS FOR PRODUCING CELLS FOR LIQUID CRYSTAL DISPLAY DEVICES

This is a Continuation of application Ser. No. 07/218,003, filed July 13, 1988, and now abandoned.

FIELD OF THE INVENTION

The present invention provides a process for tightly bonding two opposing substrates while keeping a uniform spacing therebetween. The process is particularly useful for producing liquid crystal display device cells wherein large-scale substrates are bonded with a uniform spacing as narrow as several micrometers, and more particularly, for cells using ferroelectric liquid crystals wherein opposing substrates are bonded with an extremely narrow spacing.

BACKGROUND OF THE INVENTION

Display devices using nematic liquid crystals are widely used these days in applications such as watches, word processors, compact TV sets, etc.

The twist nematic (TN) type or the super twist nematic (STN) type devices which are mainly used now have a response time as slow as several miliseconds, and are inferior in visual field of display properties so that their application is limited. Display elements using ferroelectric liquid crystals are gaining great interest these days. These liquid crystals, though being smectic, have spontaneous polarization which provides quick response of several to several tens of microseconds (see, e.g., N.A. Clark and S.T. Lagerwall, *Applied Physics Lett.*, 36(11), page 899 (1980) incorporated herein by reference. To obtain the quick response, however, the inner cell width of the ferroelectric liquid crystal device panel should be as small as from 1 $\mu$m to 4 $\mu$m. In addition, ferroelectric liquid crystal characteristics are more like crystals than to nematic liquid crystals in that the crystal arrangements are easily destroyed by softly touching the center of the panel, and ferroelectric liquid crystals do not recover their initial arrangement in the way that nematic liquid crystals do. That is, ferroelectric liquid crystals have problems in that they have poor shock resistance.

As a solution to the aforesaid problems, a method using a space layer comprised of a light-insensitive polyimide based organic polymer material prepared by etching using a photoresist, or is prepared from a photosensitive polyimide based organic polymer precursor which is patternwise polymerized, is disclosed in JP-A-61-196230 (the term "JP-A" as used herein means an "unexamined published Japanese patent application"). The cell spacing could be set at relatively high precision using the method; however, the ferroelectric liquid crystal cells produced by such method have poor shock resistance, and thus are very difficult to handle.

SUMMARY OF THE INVENTION

An object of this invention is to provide a process for producing cells for display devices, particularly large scale cells, using ferroelectric liquid crystals in a tightly and uniformly bonded state.

Another object of this invention is to provide a liquid crystal display device panel using cells, which has a uniform cell spacing and improved shock resistance.

The objects of this invention can, be achieved by a process for producing a cell for liquid crystal display device, which comprises the steps of providing an adhesive which contains spherical or rod-like spacers on at least one of display areas of two transparent substrates having provided on each of the surfaces thereof a transparent electrode and an alignment layer, in a dot-like or stripe-like pattern by letterpress printing, and bonding the substrate thus printed to another transparent substrate facing each other.

BRIEF DESCRIPTION OF THE FIGURES

The process of the present invention will be as described with reference to the accompanying drawings, in which:

FIG. 1 shows a representative display cell according to the present invention.

FIGS. 2(a) and 2(b) show representative liquid crystal display device panels using cells according to the present invention.

DETAILED DESCRIPTION OF THE INVENTION

Figure 3A:
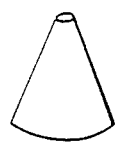
FIGS. 3(a-d) show letterpress printing elements which may be employed in applying the adhesive material.
Figure 3B:
Figure 3C:
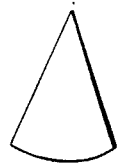
Figure 3D:
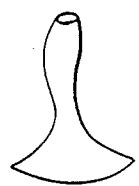

As a means for applying the spacer-containing adhesive, the present invention employs letterpress printing for the printing of adhesives. If lithographic printing is employed, it is difficult to obtain a thick coating and a complicated process such that repeated coating is required. The adhesive of the present invention is preferably applied in a dot-like pattern with a diameter of 60 $\mu$m or less, or in a stripe pattern with a width of 60 $\mu$m or less, since such a pattern reduces flickering in the image face. Since adhesives are applied in such small dot patterns, not only may letterpress printing with convex section in a trapezoid form be used, but also a trapezoid having a concave on the top, or a triangle may suitably be used. Also, a special form may be used as a letterpress printing element. Letterpress printing may be further categorized as offset and direct printing. In the case of offset printing, the printing element transfer face may touch the alignment layer on the substrate and damage the alignment (orientation). Therefore, direct printing is preferred.

As for the adhesive used in the present invention comprising a printing process, those having long pot-life are preferred. Examples include epoxy type adhesives of the thermosetting type such as Stractbond X-7490 by Mitsui Toatsu Chemicals, Inc., and ultraviolet-curing type adhesives such as Aronix series adhesive by Toagosei Chemical Industry Co., Ltd.

Spherical or rod-like spacers should be kneaded together with the adhesive to set the cell spacing. Spherical aluminum oxide and plastics, and rod-like glass are possible spacers, and examples include inorganic substances such as ALufit by Showa Denko K.K., and PF series by Nippon Electric Glass Co., Ltd., and organic substances such as Microparl by Sekisui Fine Chemical Co., Ltd., Epostar by Nippon Shokubai Kagaku Kogyo Co., Ltd. and Tospearl by Toshiba Silicon Co., Ltd. Further, when the display area on the substrate is as large as $10^4$ mm$^2$ or more, aforesaid spacers may be in an appropriately dispersed pattern on the display area to maintain uniform cell spacing, by providing 250 dots/mm$^2$.

The cell spacing can be determined by the spacers used. That is, when spherical spacers are used, the cell spacing is determined by a diameter of sphere and when rod-like spacers are used, the cross section diameter of the spacers determines the cell spacing.

In the present invention, the spacers have a uniform or approximately uniform size distribution measured as diameter of sphere or cross-section of rod. For example, if the spacers to be used are spherical, the mean diameter may be 2 μm and the standard deviation may be 0.06 μm.

If the spacers are in a rod form, the length to diameter ratio range of the rods should be 5:1 to 40:1.

The adhesive on the present invention may be applied either in a dot-like or in a stripe-like pattern, or in a mixed pattern thereof. Short stripes may be formed discontinuously. The adhesive may be applied in a density of 0.3 dots/mm$^2$ in the case of a dot-like pattern, and 2 stripes/mm in the case of a stripe-like pattern, to insure the uniformity of the spacing between opposing substrates and to insure shock resistance.

The substrate used in the present invention is not limited provided that it is transparent and that a transparent electrode can be applied. Generally preferred are substrates of glass or plastic.

An alignment layer to induce the ferroelectric liquid crystal to align should be formed on the substrate which has been applied on the electrode. Generally, insulating polymer thin films such as polyimide, polyamide, polyether amide, polyvinyl alcohol, polyester, polyether sulfone, polysulfone, nylon, polycarbonate, and cellulose derivatives, or plasma-polymerization films are suitably used as the alignment layer. Inorganic thin films such as $SiO_2$ and the like may be used, if desired. Also desirably, a rubbing treatment is performed on at least one of the substrates to give a better aligned liquid crystal.

The present invention is illustrated in further detail in the following examples.

EXAMPLE 1

Polyimide LX 5400 (manufactured by Hitachi Chemical Co., Ltd.) was applied to the electrode side of a (1.1 mm thick glass plate having a transparent electrode made of indium tin-oxide (ITO), fired at 325° C. for 1 hour, and rubbing-treated to beforehandedly form an oriented film. An adhesive, Stractbond X-7490 (manufactured by Mitsui Toatsu Chemicals, Inc.), kneaded with Epostar GP20 (manufactured by Nippon Shokubai Kagaku Kogyo Co., Ltd.) was applied on the above substrate by letterpress printing to give adhesive dots of 17 μm in diameter at a density of about 250 dots/mm$^2$. The other substrate was treated in the same manner as above to form an alignment layer, subjected to rubbing treatment, and bonded with the above printed substrate facing each other. The cell spacing measured after thermosetting treatment gave a relatively uniform value of 2.18±0.02 μm. The adhesive had a diameter of dot shape of about 30 μm. A ferroelectric liquid crystal CS 1015 (produced by Chisso Corp.) was sealed in the cell at 100° C. and cooled at the rate of 0.5° C./min. The cell showed a homogeneous alignment and no substantial color irregularity was observed. No disordering in alignment was observed when a ball of 8.7 g in weight was dropped from a height of 55 cm on the center of the cell, indicating an excellent shock resistance.

EXAMPLE 2

A cell having printed a stripe-like adhesive was prepared in the same manner as in Example 1. Stripes of 16 μm wide were formed at the density of 2 stripes/mm$^2$. The cell spacing was 2.11±0.02 μm, and an excellent alignment was observed. No disordering in alignment was observed when a ball of 8.7 g in weight was dropped from a height of 58 cm on the center of the cell, indicating an excellent shock resistance.

COMPARATIVE EXAMPLE 1

A 20 μm wide and a 2 μm height stripe-like pattern of Photopal PL-1100 (manufactured by Hitachi Chemical Co., Ltd.) was beforehandedly formed at the density of 2 stripes/mm$^2$ on the same substrate as that used in Example 1, and formed into a cell with a sticker being applied on the periphery of the cell. The cell spacing was 2.24±0.04 μm, showing more or less damaged uniformity. The same ferroelectric liquid crystal, CS 1015, used in Example 1 was sealed in the cell. Zig-zag defects were partly generated, however, the alignment was relatively good. A reverse domain formed when a gall of 8.7 g in weight was dropped on the center of the cell.

While the invention has been described in detail and with reference to specific embodiments thereof, it will be apparent to one skilled in the art that various changes and modifications can be made therein without departing from the spirit and scope thereof.

What is claimed is:

1. A process for producing a cell for a ferroelectric liquid crystal display device, which comprises the steps of providing, in sequence, at least a first substrate, an electrode, an alignment layer, a layer having a display cell for containing a liquid crystal, a second alignment layer, a second electrode, and a second substrate, and further comprising the steps of printing an epoxy adhesive or ultra-violet-curing adhesive which contains spherical or rod form spacers having a mean diameter of 1 to 4 μm in the sphere or cross section of the rod on at least one face of said alignment layers in a dot pattern with a diameter of 60 μm or less, or a stripe pattern with a width of 60 μm or less, by letterpress printing with a letterpress printing element having a convex section in a trapezoid form, a trapezoid having a concave on the top or a triangle form, and bonding the substrate thus printed to the other transparent substrate facing the printed substrate.

2. A process as in claim 1, wherein the spacer is in a rod form and the length to diameter ratio range of the rods is 5:1 to 40:1.

3. A liquid crystal device comprising, in sequence, at least a first substrate, an electrode, an alignment layer, a layer having a display cell containing a liquid crystal, a second alignment layer, a second electrode, and a second substrate, wherein said display cell additionally contains an adhesive on display area in a dot pattern with a diameter of 60 μm or less, or a stripe pattern with a width of 60 μm or less, said adhesive material contains spacers, and said spacers are spherical or rod form and have a substantially uniform diameter of 1 to 4 μm through the circular cross section.

* * * * *